US010738725B2

(12) United States Patent
Kees et al.

(10) Patent No.: US 10,738,725 B2
(45) Date of Patent: Aug. 11, 2020

(54) CRANKSHAFT CONTROLLER

(71) Applicant: FORD GLOBAL TECHNOLOGIES, LLC, Dearborn, MI (US)

(72) Inventors: Donatus Andreas Josephine Kees, Billericay Essex (GB); Baekhyun Cho, Billericay Essex (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 16/263,426

(22) Filed: Jan. 31, 2019

(65) Prior Publication Data

US 2019/0242308 A1 Aug. 8, 2019

(30) Foreign Application Priority Data

Feb. 5, 2018 (GB) .................................. 1801834.1

(51) Int. Cl.
*F02D 41/00* (2006.01)
*B60W 20/00* (2016.01)
(Continued)

(52) U.S. Cl.
CPC ........... *F02D 41/009* (2013.01); *B60W 10/06* (2013.01); *B60W 10/08* (2013.01); *B60W 20/00* (2013.01);
(Continued)

(58) Field of Classification Search
CPC ..... F02D 2041/0092; F02D 2041/0095; F02N 2200/021; F02N 2200/14; F02N 19/005; F02N 2019/008
See application file for complete search history.

(56) References Cited

U.S. PATENT DOCUMENTS 7,257,480 B2 * 8/2007 Kassner ................ F02D 41/009 701/112
7,275,519 B2 * 10/2007 Miyazaki ............. F02D 35/027 123/431
(Continued)

FOREIGN PATENT DOCUMENTS

CN 202264650 U 6/2012
CN 105909378 A 8/2016
(Continued)

OTHER PUBLICATIONS

SKF Group; Railway Technical Handbook, vol. 1; pp. 1-16; 2012.
(Continued)

*Primary Examiner* — Kevin R Steckbauer
(74) *Attorney, Agent, or Firm* — Brooks Kushman PC; David Kelley

(57) ABSTRACT

A hybrid electric vehicle includes a controller and control method to control position of a crankshaft of an internal combustion engine when the engine is stopped and the vehicle is moving to balance bearing wear associated with road-surface induced vibrations or oscillations imparted to the bearings while the crankshaft is not rotating. The controller is configured to store information relating to a cumulative time stopped at a plurality of angular positions of the crankshaft while the vehicle is in operation and/or moving, and to control stopping or repositioning of the crankshaft to balance or approximately evenly distribute the stopping positions among the plurality angular stopping positions to reduce or eliminate the possibility of excessive wear at any particular position relative to the others.

19 Claims, 2 Drawing Sheets

(51) Int. Cl.

| | |
|---|---|
| ***B60W 10/06*** | (2006.01) |
| ***B60W 10/08*** | (2006.01) |
| ***B60W 30/192*** | (2012.01) |
| ***B60W 30/184*** | (2012.01) |
| ***F02N 11/04*** | (2006.01) |
| *B60W 50/14* | (2020.01) |
| *F02N 11/08* | (2006.01) |

(52) U.S. Cl.
CPC ...... *B60W 30/1846* (2013.01); *B60W 30/192* (2013.01); *F02N 11/04* (2013.01); *B60W 2050/143* (2013.01); *B60W 2510/0685* (2013.01); *F02D 2041/0092* (2013.01); *F02D 2041/0095* (2013.01); *F02N 11/08* (2013.01); *F02N 2200/021* (2013.01); *F02N 2200/14* (2013.01)

(56) References Cited

U.S. PATENT DOCUMENTS 8,226,525 B2 * 7/2012 Swales .................. B60W 10/08 477/3
9,108,641 B2 * 8/2015 Yone ..................... B60W 40/12
9,279,382 B2 * 3/2016 Genko .................. F02D 41/123
9,352,643 B2 * 5/2016 Yone ........................ B60K 5/12
9,670,856 B2 * 6/2017 Uchida ................... F02D 41/30
10,145,327 B2 * 12/2018 Okazaki .................. F02D 17/04
10,156,217 B2 * 12/2018 Shoda ................... F02D 41/065
2002/0093202 A1 * 7/2002 Downs ................... B60K 6/485 290/40 R
2004/0153235 A1 * 8/2004 Kataoka ................. B60K 6/485 701/112
2006/0142927 A1 * 6/2006 Kassner ................ F02D 41/009 701/112
2006/0207562 A1 * 9/2006 Miyazaki .............. F02D 35/027 123/431
2011/0053733 A1 * 3/2011 Swales .................. B60W 10/08 477/3
2014/0107909 A1 * 4/2014 Genko .................. F02D 41/123 701/108
2014/0200764 A1 * 7/2014 Yone ........................ B60K 5/12 701/36
2014/0200792 A1 * 7/2014 Yone ..................... B60W 40/12 701/102
2015/0025779 A1 * 1/2015 Uchida ................. F02D 41/009 701/104
2015/0252771 A1 * 9/2015 Shoda ................... F02D 41/065 123/445
2016/0096523 A1 * 4/2016 Ang ...................... B60W 20/40 701/22
2017/0241365 A1 * 8/2017 Okazaki .................. F02D 17/04
2019/0195156 A1 * 6/2019 Han ...................... F02D 41/062

FOREIGN PATENT DOCUMENTS

| | | | |
|---|---|---|---|
| DE | 102009036444 | A1 | 2/2011 |
| DE | 102009044472 | A1 | 3/2011 |
| DE | 102013204488 | A1 | 9/2014 |
| EP | 2738058 | A1 | 6/2014 |
| JP | 2012035781 | A | 2/2012 |
| JP | 2015033963 | A | 2/2015 |
| JP | 2016217231 | A | 12/2016 |
| WO | 2012069201 | A2 | 5/2012 |
| WO | 2017006161 | A1 | 1/2017 |

OTHER PUBLICATIONS

Wikipedia; False Brinelling; https://en.wikipedia.org/w/index.php?title=False_brinelling&oldid=900841286; pp. 1-4; Jun. 7, 2019.

Wikipedia; Brinelling; https://en.wikipedia.org/w/index.php?title=Brinelling&oldid=688058511; pp. 1-2; Oct. 29, 2015.

Barden Precision Bearings; Bearing Failure: Causes and Cures; pp. 1-15.

Combined Search and Examination Report for Great Britain Application No. 1801834.1 dated Aug. 6, 2018.

Extended European Search Report for European Application No. 19152195.4 dated Jul. 22, 2019.

GB Examination Report GB 1 801 834.1 Filed Aug. 3, 2018. 6 pages.

* cited by examiner

CRANKSHAFT CONTROLLER

CROSS-REFERENCE TO RELATED APPLICATIONS

This application claims foreign priority benefits under 35 U.S.C. § 119(a)-(d) to GB Application 1 801 834.1 filed Feb. 5, 2018, which is hereby incorporated by reference in its entirety.

TECHNICAL FIELD

This disclosure relates generally to a controller and control method for a crankshaft, in particular for a crankshaft of a hybrid electric vehicle.

BACKGROUND

In recent years, hybrid electric vehicles (HEV) have become increasingly common, and this trend seems likely to continue. Hybrid electric vehicles comprise at least two power units: an electric motor and a further power unit. The further power unit is generally an internal combustion engine (ICE) and typically a petrol engine, although diesel engines, liquid petroleum gas engines or other engines may also be used. The exact means by which the power allowing the vehicle to move is supplied varies depending on the specific vehicle configuration, but all available power units are generally involved. An example of a common power scheme is one in which the electric motor is used to satisfy power requirements up to a given level, and then the further power unit (for example, ICE) is used in conjunction with the electric motor to provide power above the given level. Alternatively, the further power unit may operate even when the power output from this further power unit is not required to move the vehicle, with the power output from the further power unit instead being used to charge one or more batteries, which the electric motor can draw on. Alternative power supply schemes, which may incorporate one or both of the schemes discussed above, can also be used.

As mentioned in the passage above, electric motors in hybrid electric vehicles typically draw on batteries as energy reserves, draining the batteries as they provide motive power for the vehicle. Other energy storage means, such as capacitors or flywheels, may also be used, although battery storage is the most commonly used energy storage means. One example of a mechanism by which the battery may be charged is discussed above, whereby a further engine of the hybrid electric vehicle is used to charge the battery. The battery may also be charged by further vehicle systems, such as regenerative braking systems which store energy recovered during braking in the battery. In addition to (or alternatively to) the battery charging systems discussed above, an external power source may also be used to charge the battery. The hybrid electric vehicle may be connected to a power source such as a large external battery or generator or a mains electric connection via a power cable or other power supply connection (such as inductive charging). The power source can be used to charge the battery, typically while the HEV is stationary (for example, if the HEV is a personal car, while the HEV is parked overnight), and then the battery charge can subsequently be used to provide motive power. Use of external charging means can allow the battery to be fully charged faster than vehicle-based systems. Further, by using a combination of external power sources and vehicle-based systems, the distance the vehicle is able to travel between refueling/recharging stops can be increased. As such, vehicles that allow the use of both external power sources and vehicle-based systems can be referred to as Range Extender Vehicles (REVs) or Plug In Hybrid Electric Vehicles (PHEVs).

Generally, REVs and PHEVs are configured to draw stored energy from batteries as much as possible, without engaging the further power unit (for example, ICE). This mode of operation is usually more cost efficient than modes which utilize the further power unit to a greater extent, because a unit of energy obtained from an external power source (such as a mains electricity connection) will typically be a fraction of the cost of an equivalent unit of energy obtained in the form of petrol, LPG, diesel, and so on. As a result of this mode of operation, it is common for an ICE to be inactive for a comparatively large portion of the hybrid electric vehicle lifetime, even during periods while the hybrid electric vehicle is in motion.

When an ICE is deactivated, the crankshaft of the ICE will typically stop in one of a limited number of discrete angular positions. For example, where a full rotation of the crankshaft with respect to the remainder of the ICE encompasses the rotation of a given point on the circumference of the crankshaft through 360° about the rotational axis of the crankshaft, the crankshaft may naturally stop with the given point rotated through 90°, 180°, 270° or 360°. The crankshaft is caused to stop at a limited number of angular positions due to the engine geometry, with factors such as the number and arrangement of the cylinders determining the discrete positions. Of course, the use of four discrete angular positions listed above (90°, 180°, 270° and 360°) is simply an example, and other numbers and spacings (including uneven spacings) of discrete angular positions will be engendered by other ICE configurations.

In a traditional vehicle powered exclusively by the ICE, the limited number of crankshaft angular stopping positions would not be a major concern; the ICE would, by necessity, be operational while the vehicle was in operation and therefore the crankshaft would be rotating. However, in hybrid electric vehicles, and particularly in REVs/PHEVs, the ICE will commonly be inactive while the vehicle is in operation. While the ICE is inactive and the vehicle is in operation, the motion of the vehicle (particularly vibrations due to road surfaces over which the vehicle travels) can cause the rolling elements in crankshaft bearings to impact into the bearing races. A cumulative result of these impacts may result in what is referred to as false brinelling, a process whereby the repeated impacts between the rolling elements and the races form wear marks in both the bearings and the races, leads to an uneven wear pattern in the bearing elements and potentially to the premature wear of the bearing. In general, false brinelling may refer to bearing damage associated with fretting, with or without corrosion that results in imprints that appear similar to brinelling, but are caused by a different mechanism, such as vibration or oscillation when the bearing is not rotating.

SUMMARY

In one or more embodiments, a vehicle controller controls stopping position of a crankshaft of an internal combustion engine in a hybrid electric vehicle to more evenly distribute wear associated with false brinelling. The controller may include software and/or hardware functioning as an evaluation unit, a memory connected to the evaluation unit and configured to store cumulative durations that the crankshaft has spent in each angular position among a plurality of angular positions, and a position sensor connected to the evaluation unit and configured to monitor an angular stop position, from among the plurality of angular positions, of the crankshaft, and control stopping position and/or reposition the crankshaft to balance cumulative vehicle operation time for each of the plurality of stopping positions.

In various embodiments, the evaluation unit of the control may, when a first condition is satisfied, be configured to: determine the angular position of the crankshaft using data from the position sensor and record the angular stop position of the crankshaft in the memory. When a second condition is satisfied, the evaluation unit may be configured to determine the time duration during which the crankshaft remained in the recorded angular stop position with the vehicle in operation and record the determined time duration in conjunction with the recorded angular stop position in the memory. The first condition may comprise an instruction to stop the internal combustion engine being received by the controller, and the second condition may comprise an instruction to start the internal combustion engine being received by the controller. By monitoring the cumulative duration while the vehicle is in operation that the crankshaft spends stopped in each of the plurality of angular positions, the wear on the crankshaft bearings associated with false brinelling can be accurately predicted. By controlling the stopping position and/or repositioning the crankshaft, the wear can be distributed around the bearing/race so that one position does not experience excessive wear relative to the other positions. This information can be stored and then used when the PHEV is serviced to determine if crankshaft inspection or repair is desirable.

The controller may be further configured such that, when the first condition is satisfied the evaluation unit, after determining the angular position of the crankshaft using data from the position sensor, retrieves from the memory the plurality of cumulative durations corresponding to the plurality of angular positions, respectively; determines the difference between the highest cumulative duration among the plurality of cumulative durations and the lowest cumulative duration among the plurality of cumulative durations; and if the difference is greater than a first threshold value, instructs the rotation of the crankshaft to stop at the angular position corresponding to the lowest cumulative duration and record the angular position corresponding to the lowest cumulative duration in the memory as the angular stop position of the crankshaft. In this way, the wear on the bearings of the crankshaft can be spread more equally across the plurality of angular positions, to avoid excessive wear at any one angular position and maximizing the lifetime of the crankshaft prior to maintenance. An example of a suitable first threshold value is 15 minutes (0.25 hours), although other first threshold values may also be used as desired, primarily determined by the specific configuration of the PHEV.

The controller may be configured to instruct the electric motor to cause the crankshaft to stop at the angular position corresponding to the lowest cumulative duration, or alternatively may be configured to instruct the internal combustion engine to cause the crankshaft to stop at the angular position corresponding to the lowest cumulative duration. Although either the electric motor or ICE may be used to control the rotation of the crankshaft, depending on the HEV configuration, use of the electric motor may provide an additional advantage of allowing additional angular stop positions than those provided by the ICE to be used, thereby potentially further extending the lifetime of the crankshaft. Some configurations may separately use both the electric motor and the ICE to cause the crankshaft to stop at the desired angular position; this configuration may increase both the complexity and the versatility of the system.

The controller may be configured such that, when retrieving from the memory the plurality of cumulative durations, the evaluation unit determines if the highest cumulative duration exceeds a second threshold value. If the highest cumulative duration exceeds the second threshold value, a maintenance warning is output. The maintenance warning can be used to indicate to the user of the vehicle, or a mechanic, the wear level of the crankshaft bearings. By indicating the wear level, decisions regarding the maintenance of the crankshaft can be made without the requirement to physically inspect the crankshaft. The maintenance warning can be issued at any suitable point, for example at the end of the service life of the crankshaft.

The number of angular positions used in the system is determined by the system properties, such as the size ratio between the rolling elements and the races of the bearings. The angular positions are generally equally spaced around the circumference of the crankshaft, and are generally spaced sufficiently far apart so as to not overlap one another. As an example, the system may consist of 60 angular positions, arranged at intervals of 6° about the crankshaft circumference.

In addition to an instruction to stop the internal combustion engine being received by the controller, the first condition may further comprise determining that the electric motor of the hybrid electric vehicle is operating and/or that the HEV is moving. Although some wear may occur to the bearing while the vehicle is stationary (and neither of the electric motor or ICE is operating), false brinelling would typically occur when the ICE is inoperative and the vehicle is in motion, being powered or regeneratively braked by the electric motor. Accordingly, by including a check that the electric motor of the hybrid electric vehicle is operating in the first condition, the accuracy with which the wear of the bearings can be estimated is increased.

The position sensor may be a bi-directional crankshaft position sensor installed on the internal combustion engine, or alternatively may be a resolver or an angular position sensor installed on the electric motor. The choice of whether to use a position sensor located on the ICE or the electric motor can be made taking into account other properties of the system, such as the proximity of the evaluation unit to the ICE and electric motor, respectively, or existing sensors which may be included on one or both of the ICE and electric motor for other purposes.

A hybrid electric vehicle may comprise the controller as discussed above, and may further comprise an electric motor and an internal combustion engine, the internal combustion engine comprising a crankshaft. As discussed above, the system is particularly effective where the ICE is used sparingly during the operation of the vehicle, that is, when the vehicle is primarily powered by the electric motor. Therefore, the system is even more effective where the hybrid vehicle comprises a battery unit, which may be charged using an external electric connection to an external power source in addition to being charged by the internal combustion engine output, and the operational time of the ICE is a low fraction of the operational time of the HEV.

According to a further aspect of the present disclosure, there is provided a method for controlling a crankshaft of an internal combustion engine in a hybrid electric vehicle using a controller, the method comprising: when a first condition is satisfied, determining an angular position of the crankshaft from among the plurality of angular positions using data from a position sensor; and recording the angular stop position of the crankshaft in a memory. When a second condition is satisfied: determining the time duration during which the crankshaft remained in the recorded angular stop position; and recording the determined time duration in conjunction with the recorded angular stop position in the memory, wherein the first condition comprises an instruction to stop the internal combustion engine being received by the controller, and the second condition comprises an instruction to start the internal combustion engine being received by the controller. The method may further comprise: storing in a memory cumulative durations that the crankshaft has spent in each angular position among the plurality of angular positions, and when the first condition is satisfied; retrieving from the memory the plurality of cumulative durations corresponding to the plurality of angular positions, respectively; determining the difference between the highest cumulative duration among the plurality of cumulative durations and the lowest cumulative duration among the plurality of cumulative durations; and if the difference is greater than a first threshold value, stopping the crankshaft at the angular position corresponding to the lowest cumulative duration and recording the angular position corresponding to the lowest cumulative duration in the memory as the angular stop position of the crankshaft. The advantages provided by the method are as discussed above in the context of the controller.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment even though a particular combination of features or aspects is not specifically illustrated or described.

DETAILED DESCRIPTION

Figure 1:
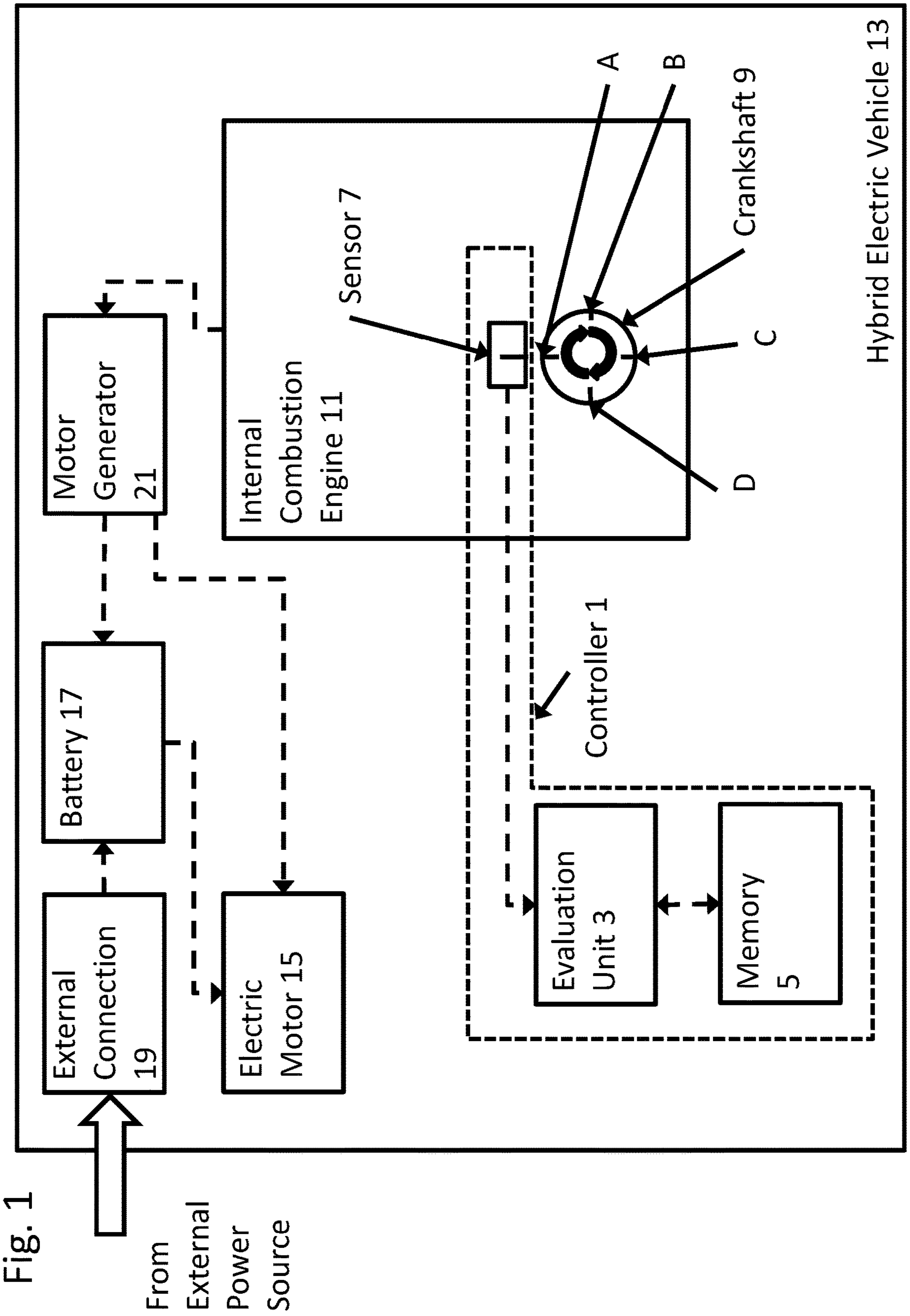
FIG. 1 is a schematic diagram of a hybrid electric vehicle including a controller and an internal combustion engine.

A controller 1 in accordance with the present disclosure is shown in FIG. 1. The controller 1 comprises an evaluation unit 3, a memory 5, and a sensor 7. The controller 1 (or the evaluation unit 3 and memory 5 of the controller 1) may be integrated into a larger engine management system. Alternatively, the controller 1 may be a separate unit. To illustrate a relationship between the sensor 7 of the controller 1 and a crankshaft 9 of an internal combustion engine (ICE) 11, these components of a hybrid electric vehicle (HEV) 13 are also shown schematically in FIG. 1.

In FIG. 1, the direction of rotation of the crankshaft 9 of this example system is shown using curved arrows. Four angular positions spaced around the circumference of the crankshaft 9 are also marked in FIG. 1, using the reference signs A, B, C and D. The angular positions may be defined with respect to, for example, the remainder of the ICE 11. In FIG. 1, the crankshaft 9 has stopped in position A. FIG. 1 shows four angular positions for simplicity; typically the plurality of stop positions of the crankshaft 9 would consist of a larger number of angular positions, such as 60 angular positions, for example. Selection of the number of angular positions may vary based on the particular application and implementation.

The HEV 13 in FIG. 1 also includes a battery 17, which can be charged by the ICE 11 (via an electric machine or moto/generator 21) or using an external power source (such as an external battery, renewable power source or connection to mains electricity) via an external electric connection 19. As discussed above, the system is even more effective where the hybrid vehicle comprises one or more batteries 17, which may be charged using an external electric connection 19 to an external power source in addition to being charged by the internal combustion engine output, because the operational time of the ICE 11 in such systems is often a low fraction of the operational time of the HEV 13.

For simplicity in the schematic of FIG. 1, only some of the potential connections between components have been illustrated. As an example of this, the potential connection between the electric motor 15 and the crankshaft 9 allowing the electric motor 15 to be used to adjust the angular position of the crankshaft 9 if desired, has not been shown. The omission of some potential connections does not imply that these connections are any more or less important than the displayed connections. Any omitted connections are simply to improve the clarity of the diagram.

Figure 2:
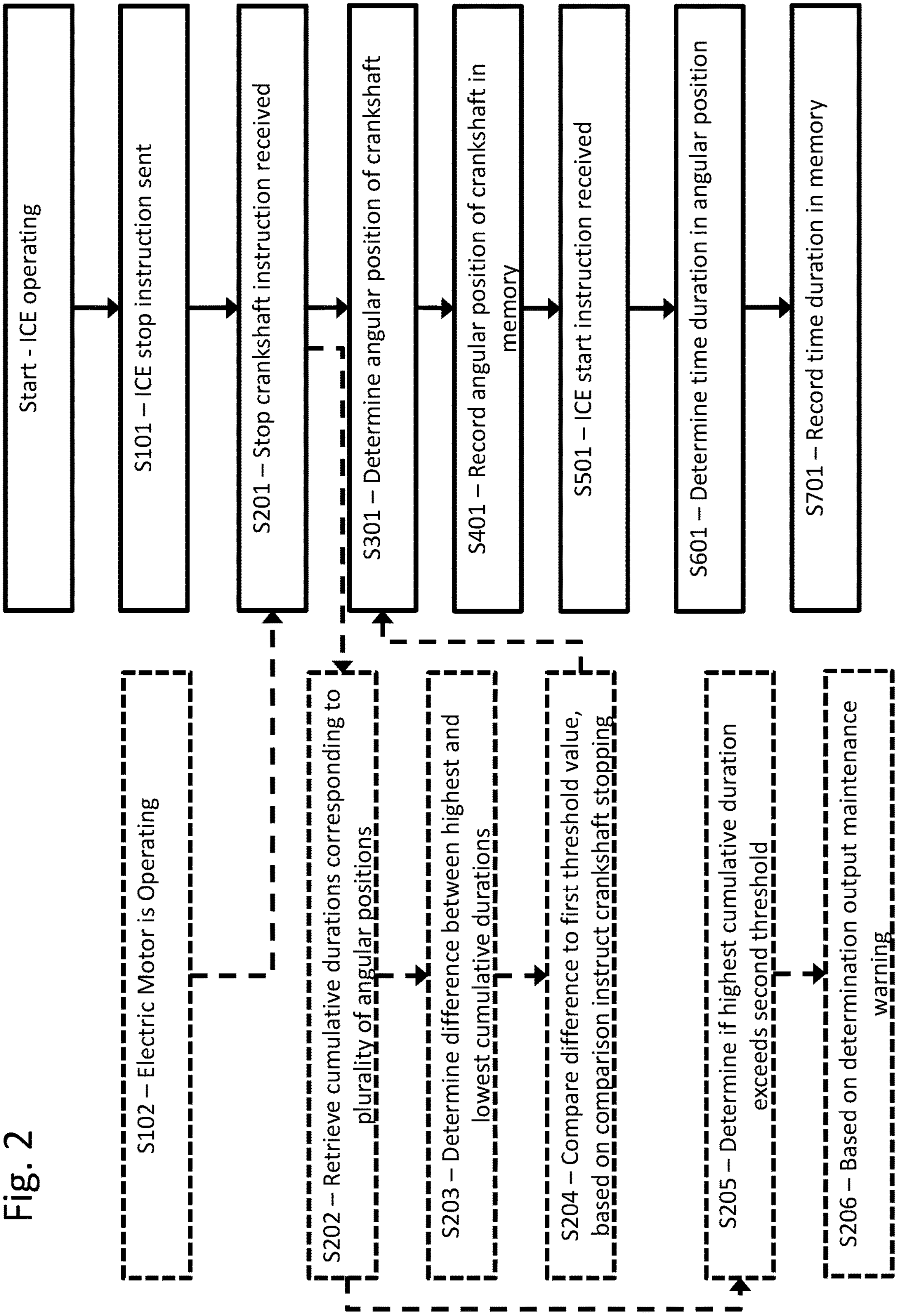
FIG. 2 is a flowchart illustrating operation of a system or method for controlling crankshaft position when the internal combustion engine is stopped.

FIG. 2 shows a flowchart illustrating operation of a system or method for controlling a crankshaft according to various embodiments. The method illustrated by FIG. 2 is for illustrative purposes only, and some of the steps shown in FIG. 2 are optional steps. Optional steps are indicated by dashed boxes.

At the start of the method illustrated in FIG. 2, the ICE 11 is operating and is being used to generate power. The power may be directed to the motor generator 21 and used to move the HEV 13, or may be directed to a battery 17 or other energy storage unit for storage. The power may also be used to move the HEV 13 directly (without passing through the motor generator 21 and the electric motor 15). In step S101, an instruction to stop the ICE 11 is sent. The instruction may be generated automatically by an engine management unit or may be manually input by a user of the HEV 13.

The instruction to stop the ICE 11 is received by the controller 1 (as shown in step S201). The first condition may also include further requirements, such as determining that the electric motor 15 is operating (see step S102), in order to be satisfied. As explained above, although some wear may occur to the bearing while the vehicle is stationary (and neither of the electric motor 15 or ICE 11 is operating), the false brinelling may occur due to vibrations or oscillations imparted from the roadway when the ICE 11 is inoperative and the vehicle is in motion, being powered by the electric motor 15. Accordingly, by including a check that the electric motor 15 of the hybrid electric vehicle 13 is operating in the first condition, the accuracy with which the wear of the bearings can be estimated is increased. Similarly, by controlling the stopping position of the crankshaft, or repositioning the crankshaft after stopping, the wear associated with false brinelling can be distributed or balanced among the available plurality of stopping positions.

The evaluation unit 3 may be further configured to retrieve, from the memory 5, cumulative durations corresponding to each of the plurality of angular positions (S202). The cumulative durations indicate the total time of vehicle operation and/or vehicle movement that the crankshaft 9 has spent stopped in each of the angular positions. Where the first condition requires that the electric motor 15 is operating, the cumulative durations indicate the total time that the crankshaft 9 has spent stopped in each of the angular positions while the electric motor 15 is powered on and/or rotating. If the cumulative durations have been retrieved, the evaluation unit 3 may then determine which of the plurality of angular positions has the highest cumulative duration and which of the plurality of angular positions has the lowest cumulative duration. With reference to the FIG. 1, the memory 5 may indicate (for example) that the crankshaft 9 has spent 114.00 hours in position A, 115.25 hours in position B, 112.32 hours in position C and 110.81 hours in position D.

Using the highest and lowest cumulative durations, the evaluation unit 3 may then determines the difference between the highest and lowest cumulative durations, that is, how much longer the crankshaft 9 has spent stopped in the angular position corresponding to the highest cumulative duration than in the angular position corresponding to the lowest cumulative duration (see step S203). Turning again to the example discussed above, the evaluation unit 3 could then determine that the highest cumulative duration of 115.25 hours corresponded to angular position B, and the lowest cumulative duration of 110.81 hours corresponded to angular position D. Accordingly, the difference could be determined as 115.25-110.81=4.44 hours.

If the difference between the highest and lowest cumulative durations has been obtained, the evaluation unit 3 may then compare the difference to a first threshold value (S204). An example of a suitable first threshold value is 15 minutes (0.25 hours), although other first threshold values may also be used depending on the specific configuration of the system and of the hybrid vehicle. If the difference is greater than the first threshold value, the controller 1 may then instruct the stopping of the crankshaft 9 in the angular position corresponding to the lowest cumulative duration. In this way, the wear on the bearings of the crankshaft 9 can be spread more equally across the plurality of angular positions to avoid excessive wear on any one angular position relative to the other angular positions and maximizing the lifetime of the crankshaft 9 prior to maintenance. Based on the specific configuration of the HEV 13, the rotation of the crankshaft 9 to the desired stop position may be caused by either the electric motor 15 or the ICE 11, and the HEV 13 may be configured such that both options are available. In the example situation, the difference is determined as 4.44 hours. Accordingly, if the example threshold of 15 minutes (0.25 hours) is used, then the difference is higher than the threshold. The crankshaft 9 can therefore be caused to rotate to the angular position corresponding to the lowest cumulative duration; position D in this example.

If the cumulative durations corresponding to each of the plurality of angular positions have been retrieved (step S202 has been performed), the evaluation unit 3 may be further configured to compare the highest cumulative duration among the plurality of cumulative durations against a second threshold (step S205). The second threshold can be based on a predicted operational lifetime without maintenance of the crankshaft 9, which typically would be of the order of several thousands of hours. The specific value used for the second threshold is typically determined based on the configuration of the system. If the highest cumulative duration is found to exceed the second threshold, a maintenance warning can then be output (S206). The maintenance warning can be output in any suitable way, for example, a warning light on a dashboard, an audible warning, a display on a screen in the vehicle, a warning logged in the vehicle systems to be passed to an engineer when the HEV 13 is serviced, and so on.

In addition to, or alternatively to, comparing the highest of the cumulative durations against the second threshold, further comparisons and determinations may be made using the cumulative duration values (in conjunction with the corresponding angular position values). In an example of a further comparison, a total cumulative duration may be obtained by calculating a sum of the plurality of cumulative durations corresponding to the plurality of angular positions. The total cumulative duration therefore indicates the total stationary time of the crankshaft 9 in all of the angular positions (which, as discussed above, may be the total time while the HEV is moving). This total cumulative duration can then be compared against a threshold value and, if the total cumulative duration exceeds the threshold value, a warning can then be output as discussed above. In the example discussed above, the total cumulative duration could be obtained by adding the cumulative durations for angular positions A to D, thereby obtaining a total cumulative duration of 114.00+115.25+112.32+110.81=452.38 hours.

Regardless of whether or not the cumulative duration comparison and rotation process of steps S202 to S204, or the second threshold comparison process of steps S205 and S206, have been performed, the method then continues with step S301. That is, the method may proceed to step S301 immediately following step S201. In step S301, the evaluation unit 3 then uses data supplied by the position sensor 7 to determine the angular position in which the crankshaft 9 has stopped. Typically, the position sensor 7 will monitor the position of the crankshaft 9 only when the crankshaft 9 has stopped rotating, although the position sensor 7 may also monitor the position of the crankshaft 9 constantly. Where the position sensor 7 is configured to monitor the position of the crankshaft 9 only when the crankshaft 9 has stopped rotating, these measurements may be taken automatically by the sensor 7 and sent to the evaluation unit 3, or alternatively may be taken in response to a query from the evaluation unit. In the example shown in FIG. 1, the crankshaft 9 is shown stopped in angular position A (example positions A, B, C and D are marked on FIG. 1). Once the angular position has been determined, this is recorded in the memory (S401).

The method does not require any further actions (with the potential exception of running a timer starting from the point at which the angular position of the crankshaft 9 is recorded in the memory) until a second condition is satisfied (S501), the second condition comprising that an instruction to start the ICE 11 is received by the controller 1. The second condition may also include other requirements.

When the second condition is satisfied, the time duration during which the crankshaft 9 remained in the recorded angular position is determined (S601). This determination may use the output of a timer that started at point at which the angular position of the crankshaft 9 is recorded in the memory, or an alternative time determination means such as retrieving time information from a computing or controlling system included in the HEV 13. Once the time duration has been determined, this information is recorded in the memory 5 in conjunction with the recorded angular stop position (S701). Although the information can be recorded in any form, such as a chronological listing of the stop positions linked to the durations, typically this information is recorded by maintaining a cumulative duration that the crankshaft 9 spends in each of the angular positions. Where cumulative durations are maintained for each angular position, the time duration determined in step S601 is added to any already recorded duration corresponding to the recorded angular stop position. The contents of the memory 5 may be output to the user of the HEV 13, or to an engineer servicing the HEV 13, either periodically, in response to specific queries, or when threshold values are exceeded (for example).

The present disclosure advantageously provides a controller 1 and method for controlling a crankshaft 9 of an ICE 11 and monitoring the cumulative duration that the crankshaft 9 spends stopped in each of a plurality of angular positions while the vehicle is in operation and/or moving. This allows the wear on the crankshaft 9 bearings to be accurately predicted, and the maintenance point of the bearings may be estimated and addressed by maintenance if necessary. The disclosure also relates to controllers and methods for causing the crankshaft 9 to stop in an angular position having a lowest cumulative duration if desirable, thereby allowing the wear on the bearings of the crankshaft 9 to be spread more equally across the plurality of angular positions, balancing the wear on any one angular position and maximizing the lifetime of the crankshaft 9 prior to maintenance.

As such, various embodiments of the disclosure may include a controller for a crankshaft of an internal combustion engine in a hybrid electric vehicle, the hybrid electric vehicle further comprising an electric motor, the controller comprising: an evaluation unit; a memory connected to the evaluation unit and configured to store cumulative durations that the crankshaft has spent in each angular position among a plurality of angular positions; and a position sensor connected to the evaluation unit and configured to monitor an angular stop position, from among the plurality of angular positions, of the crankshaft, wherein, when a first condition is satisfied, the evaluation unit is configured to: determine the angular position of the crankshaft using data from the position sensor; and record the angular stop position of the crankshaft in the memory, and when a second condition is satisfied, the evaluation unit is configured to: determine the time duration during which the crankshaft remained in the recorded angular stop position; and record the determined time duration in conjunction with the recorded angular stop position in the memory, wherein the first condition comprises an instruction to stop the internal combustion engine being received by the controller, and the second condition comprises an instruction to start the internal combustion engine being received by the controller.

The controller may be configured such that when the first condition is satisfied the evaluation unit is further configured, after determining the angular position of the crankshaft using data from the position sensor, to: retrieve from the memory the plurality of cumulative durations corresponding to the plurality of angular positions, respectively; determine the difference between the highest cumulative duration among the plurality of cumulative durations and the lowest cumulative duration among the plurality of cumulative durations; and if the difference is greater than a first threshold value, instruct the rotation of the crankshaft to the angular position corresponding to the lowest cumulative duration and record the angular position corresponding to the lowest cumulative duration in the memory as the angular stop position of the crankshaft.

The first threshold value may be 15 minutes, for example. The controller may also be configured to instruct the electric motor to rotate the crankshaft to the angular position corresponding to the lowest cumulative duration and/or to instruct the internal combustion engine to rotate the crankshaft to the angular position corresponding to the lowest cumulative duration.

When retrieving from the memory the plurality of cumulative durations, the evaluation unit may be further configured to determine if the highest cumulative duration exceeds a second threshold value, wherein, if the highest cumulative duration exceeds the second threshold value, a maintenance warning is output.

The plurality of angular positions may include 60 angular positions, for example, arranged at generally equal intervals of 6° about the crankshaft circumference.

The first condition may further comprise a determination that the electric motor of the hybrid electric vehicle is operating. The position sensor may be implemented by a bi-directional crankshaft position sensor installed on the internal combustion engine. Alternatively, or in combination, the position sensor may be implemented by a resolver or an angular position sensor installed on the electric motor.

In various embodiments a hybrid electric vehicle comprises a controller as previously described, an electric machine (operating as a motor/generator), and an internal combustion engine comprising a crankshaft. The hybrid electric vehicle may further comprise a battery unit, wherein the battery unit is configured to allow charging from the internal combustion engine output and from an external electric connection.

One or more embodiments provide a method for controlling a crankshaft of an internal combustion engine in a hybrid electric vehicle using a controller, the method comprising: when a first condition is satisfied: determining an angular position of the crankshaft, from among the plurality of angular positions, using data from a position sensor; and recording the angular stop position of the crankshaft in a memory, and when a second condition is satisfied: determining the time duration during which the crankshaft remained in the recorded angular stop position; and recording the determined time duration in conjunction with the recorded angular stop position in the memory, wherein the first condition comprises an instruction to stop the internal combustion engine being received by the controller, and the second condition comprises an instruction to start the internal combustion engine being received by the controller.

The method may further comprise: when the first condition is satisfied, after determining the angular position of the crankshaft using data from the position sensor: retrieving from the memory the plurality of cumulative durations corresponding to the plurality of angular positions, respectively; determining the difference between the highest cumulative duration among the plurality of cumulative durations and the lowest cumulative duration among the plurality of cumulative durations; and if the difference is greater than a first threshold value, rotating the crankshaft to the angular position corresponding to the lowest cumulative duration and recording the angular position corresponding to the lowest cumulative duration in the memory as the angular stop position of the crankshaft.

It will be appreciated by those skilled in the art that although representative embodiments have been described by way of example, with reference to one or more examples, the claimed subject matter is not limited to the disclosed examples and alternative examples may be constructed without departing from the scope of the appended claims.

What is claimed is:

1. A hybrid vehicle comprising:

an internal combustion engine having a crankshaft and associated crankshaft position sensor;

an electric machine coupled to the internal combustion engine;

a battery coupled to the electric machine; and a controller programmed to store a cumulative stopped time over multiple engine stops for each of a plurality of stopped angular positions of the crankshaft in response to a crankshaft position sensor signal while the vehicle is in operation, and control at least one of the electric machine and the internal combustion engine to control a stopped angular position of the crankshaft responsive to the cumulative stopped time for at least one of the plurality of stopped angular positions.

2. The hybrid vehicle of claim 1 wherein the controller controls at least one of the electric machine and the internal combustion engine to position the crankshaft in response to a difference between a first angular position having a highest cumulative time and a second angular position having a lowest cumulative time exceeding an associated threshold.

3. The hybrid vehicle of claim 2 wherein the associated threshold is 15 minutes.

4. The hybrid vehicle of claim 1 wherein the controller controls at least one of the electric machine and the internal combustion engine to position the crankshaft at one of the plurality of stopped angular positions corresponding to a lowest cumulative time.

5. The hybrid vehicle of claim 1 wherein the controller controls stopping position of the crankshaft during engine shutdown based on the cumulative stopped times associated with the plurality of stopped angular positions.

6. The hybrid vehicle of claim 1 wherein the controller controls at least one of the electric machine and the internal combustion engine to reposition the crankshaft to one of the plurality of stopped angular positions after engine shutdown based on the cumulative stopped times.

7. The hybrid vehicle of claim 1 wherein the controller is further programmed to output a maintenance warning in response to a highest of the cumulative stopped times exceeding a corresponding threshold.

8. The hybrid vehicle of claim 1 wherein the plurality of angular positions comprises 60 angular positions arranged at intervals of six degrees about a circumference of the crankshaft.

9. The hybrid vehicle of claim 1 wherein the controller is further programmed to increase the cumulative stopped time for a current one of the plurality of stopped angular positions only when vehicle speed exceeds a corresponding threshold.

10. The hybrid vehicle of claim 1 wherein the controller is further programmed to increase the cumulative stopped time for a current one of the plurality of stopped angular positions when the electric machine is in operation.

11. The hybrid vehicle of claim 1 wherein the battery is configured for charging by the electric machine and from an external electric connection.

12. A method for controlling a hybrid vehicle having an internal combustion engine with a crankshaft and an associated crankshaft position sensor, an electric machine, and a battery, comprising, by a controller:

controlling at least one of the internal combustion engine and the electric machine to position the crankshaft at one of a plurality of stopped positions based on cumulative stopped times over multiple engine stops at each of the plurality of stopped positions.

13. The method of claim 12 further comprising generating a maintenance alert in response to the cumulative stopped time associated with any of the plurality of stopped positions exceeding a corresponding threshold.

14. The method of claim 12 further comprising controlling at least one of the internal combustion engine and the electric machine to position the crankshaft in response to a difference between a maximum of the cumulative stopped times and a minimum of the cumulative stopped times exceeding a threshold.

15. The method of claim 12 further comprising controlling at least one of the internal combustion engine and the electric machine to position the crankshaft to one of the plurality of stopped positions corresponding to a lowest of the cumulative stopped times.

16. The method of claim 12 wherein a current one of the cumulative stopped times is increased only when vehicle speed exceeds an associated threshold.

17. A hybrid vehicle including an engine having a crankshaft, an electric machine, a battery coupled to the electric machine, and a controller, the controller programmed to:

position the crankshaft during or after stopping the engine to one of a plurality of angular crankshaft stopped positions in response to cumulative vehicle operation time at each of the plurality of angular crankshaft stopped positions over multiple engine stops.

18. The hybrid vehicle of claim 17 wherein the controller is programmed to control at least one of the engine and the electric machine to position the crankshaft.

19. The hybrid vehicle of claim 17 wherein controller is programmed to position the crankshaft at one of the plurality of angular crankshaft stopped positions having a lowest of the cumulative vehicle operation times relative to other ones of the plurality of angular crankshaft stopped positions.

* * * * *